United States Patent [19]
Hough

[11] 3,827,578
[45] Aug. 6, 1974

[54] ROTARY GRAIN DISTRIBUTION SYSTEM

[76] Inventor: Richard Murray Hough, Sunfield, Mich. 48890

[22] Filed: Sept. 25, 1972

[21] Appl. No.: 291,772

[52] U.S. Cl................ 214/16 R, 141/67, 141/93, 193/23, 214/152, 302/28
[51] Int. Cl............................................ B65g 53/00
[58] Field of Search ........ 214/17 CB, 16 R; 302/59, 302/62, 27, 28; 141/285, 44, 45, 59, 67, 93; 193/23; 222/144

[56] References Cited
UNITED STATES PATENTS

| | | | |
|---|---|---|---|
| 1,879,794 | 9/1932 | Cundall.............................. | 141/290 |
| 2,671,102 | 3/1954 | Jewell............................... | 302/59 X |
| 3,091,402 | 5/1963 | Palmer............................. | 222/144 |
| 3,339,691 | 9/1967 | Schlagel et al...................... | 193/23 |

*Primary Examiner*—Richard A. Schacher
*Assistant Examiner*—Hadd Lane
*Attorney, Agent, or Firm*—Price, Heneveld, Huizenga & Cooper

[57] ABSTRACT

A rotary grain distribution system includes a distributor having a grain filling chute and an air exhausting chute rotatably positioned within a housing. The grain chute selectively couples a grain input chute to one of a plurality of grain distribution chutes extending from the bottom of the distributor to a plurality of grain storage bins located below the distributor in a ring. The exhausting chute selectively couples the intake of a cyclone precipitator to the one of a plurality of evacuation chutes extending from the bottom of the distributor to each storage bin for the bin being filled. Particulate material collected by the precipitator is returned to the grain input chute through a rotary dump valve such that a blower coupled to the precipitator can maintain negative pressure in the system to prevent discharge of dust and particulate material therefrom.

17 Claims, 5 Drawing Figures

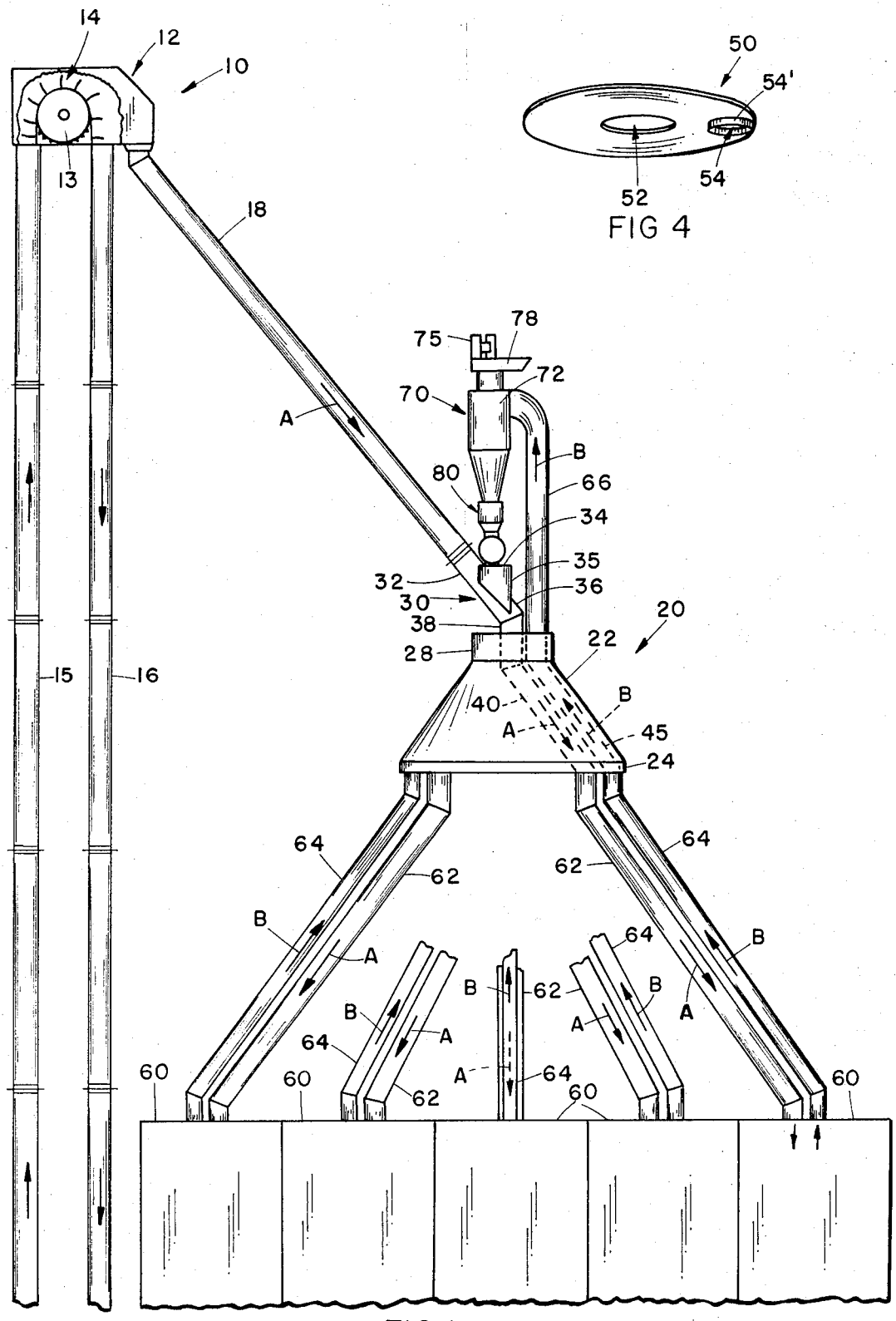

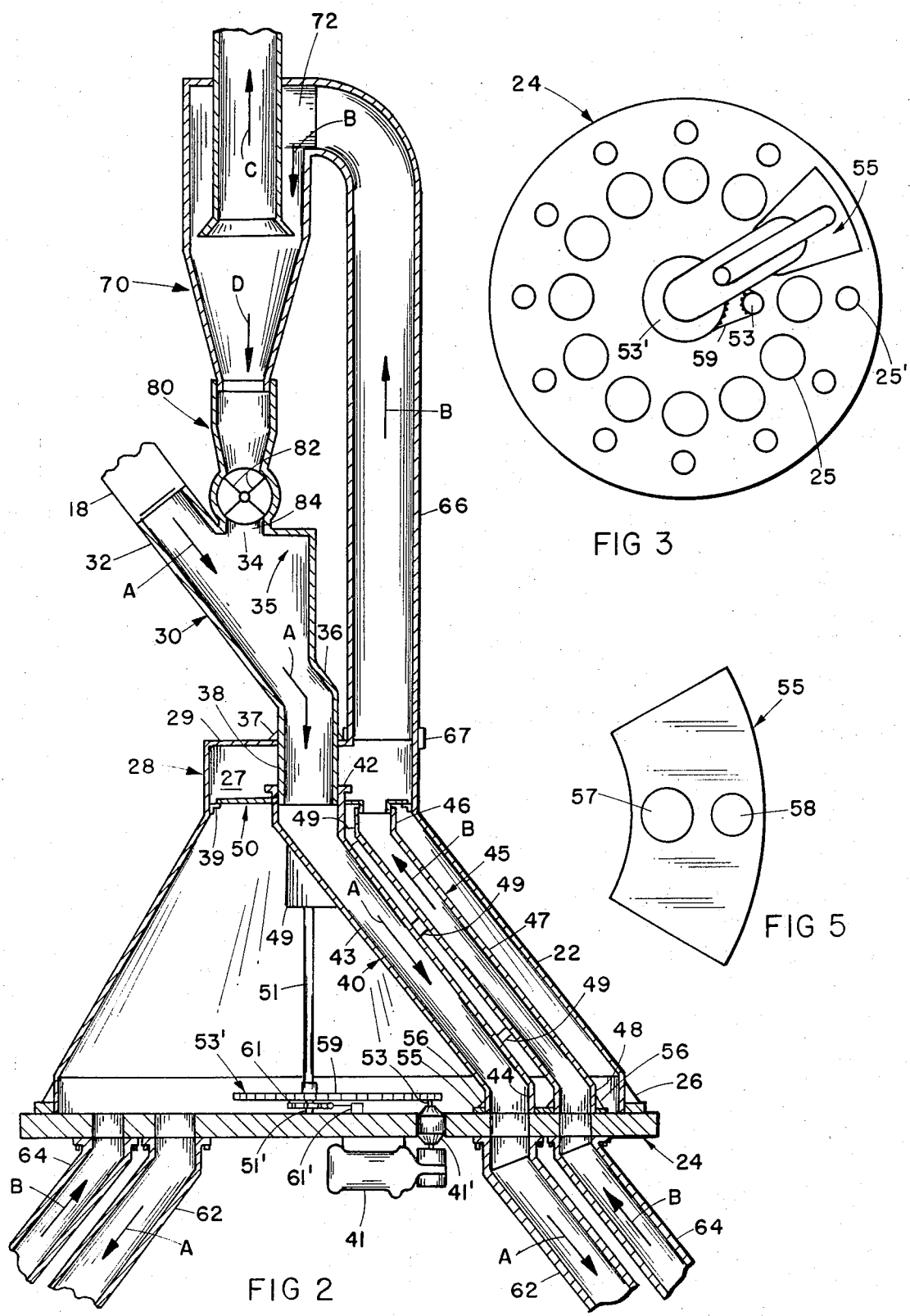

ROTARY GRAIN DISTRIBUTION SYSTEM

BACKGROUND OF THE INVENTION

The present invention relates to a rotary grain distribution system and specifically to an improved method and apparatus for increasing the efficiency of such a system.

In recent years, the use of rotary grain distribution systems for separating grain into a plurality of storage bins for storage and shipment has become increasingly popular. In a rotary system, a single distributor is employed to fill many storage bins positioned in a ring below the distributor. Such a system not only reduces the total area required for the distributor system, but also increases bin filling efficiency by being capable of switching from one bin to another rapidly.

In order to operate a rotary distribution system at relatively high grain flow rates, it is necessary to vent the storage bins since a considerable volume of air is displaced by the grain in a short period of time. Since the storage bins are generally closed to prevent access of moisture, foreign material, rodents or the like, it is necessary to either supply a venting port which can be opened during the filling operation and then closed to seal the bin; or provide sufficiently large filling chutes such that the displaced air can exhaust through the filling chute in a direction opposite the flow of grain. In the latter case, however, the reverse air flow tends to reduce the flow rate of the grain. In either case, considerable dust and/or particulate material can escape the system and must be collected or suitably disposed of in some other manner.

In some rotary distribution systems, venting has been accomplished at the top of the rotary distributor by providing an opening and in one system, an exhaust blower was coupled to the opening. U.S. Pat. Nos. 2,531,526 issued Nov. 28, 1950 to R. I. Patterson and U.S. Pat. No. 2,531,527 issued Nov. 28, 1950 to R. I. Patterson, respectively, are illustrative of these systems. The deficiencies of these systems reside in the fact that the back flow of air through the single feed pipe used reduces the efficiency of the grain filling operation and the particulate material is exhausted directly to the atmosphere or must be suitably collected at a remote location for later removal. Also in such systems and other known systems, the positive pressure build-up in the storage bin during its filling, even with venting, tends to blow dust particulate material from leakage spaces which may be present in the interconnecting joints of the system.

SUMMARY OF THE PRESENT INVENTION

In the system of the present invention, however, air evacuation is provided for each of the storage bins by providing a dual chute system whereupon the grain is fed to the storage bin through a grain feeding chute and air is actively evacuated from the storage chute through a separate evacuation chute. A cyclone precipitator draws air from the storage bin and recirculates the collected particulate material back to the stream of flow of the grain through a sealed valve thereby providing a system which operates under negative pressure. This prevents the leakage of dust particles into the atmosphere and increases the filling efficiency by eliminating the back pressure due to the displacement of air and by providing a separate air exhaust path from the storage bin. In such a system, the grain flow rate can be greatly increased and particulate removal is no longer a problem.

Apparatus embodying the broader aspects of the novel concept include a rotary distributor having filling and exhausting chutes which are selectively coupled to filling and evacuation chutes, respectively, coupled between the distributor and one of a plurality of storage bins. Material is supplied to the distributor filling chute and means are coupled to the distributor exhausting chute to evacuate air from the storage bin through the evacuation chute during the filling operation.

Apparatus embodying the novel concepts also include a distributor having a filling chute and exhausting chute rotatably mounted within a housing and which sealably engage one of a plurality of pairs of filling and evacuation chutes, each pair of which communicates between the distributor and one of a plurality of circularly positioned storage bins. An exhaust blower draws air through a precipitator coupled to the exhausting chute which returns the particulate material to the filling chute by means of a sealed valve thereby maintaining the system under negative pressure to prevent discharge of dust or particulate material from the system.

It is an object, therefore, of the present invention to provide a rotary grain distribution system which actively evacuates air directly from a storage bin during the filling thereof.

Another object of the present invention is to provide a closed cycle distribution method whereupon air and particulate material are evacuated from a storage bin during the filling thereof and the particulate material is collected and returned to the filling stream.

Still a further object of the present invention is to provide an improved rotary distribution system which actively evacuates air and particulate material from a storage bin during the filling operation and which returns collected particulate material to the filling stream during the filling operation.

These and other objects of the present invention will become apparent upon reading the following description thereof together with the accompanying drawings in which:

BRIEF DESCRIPTION OF THE DRAWINGS

FIG. 1 is a fragmentary side elevational view partly broken away of the grain distribution system;

FIG. 2 is an enlarged fragmentary cross-sectional view of the grain distributor and precipitator;

FIG. 3 is a plan view of the distributor floor also showing the distributor filling and exhausting chutes;

FIG. 4 is a perspective view of the bottom of the rotary sealing plate positioned at the top of the grain distributor; and FIG. 5 is a plan view of the sliding sealing plate positioned at the bottom of the grain distributor.

DETAILED DESCRIPTION OF THE PREFERRED EMBODIMENT

Referring now to FIGS. 1 and 2, there is shown a grain distribution system, although the invention can be employed for the distribution of a variety of other materials. The embodiment illustrated includes a grain elevator 10 which supplies grain to a rotary grain distributor 20 which in turn selectively distributes the grain among a plurality of storage bins 60 arranged in a ring below the distributor 20. The grain elevator includes an elevated housing 12 which is supported by suitable structure (not shown). The housing includes therein a rotary wheel 13 supporting one end of an endless loop bucket conveyor 14. Conveyor 14 operates to bring grain up an enclosed input leg 15 which communicates with a supply of grain and returns the empty conveyor buckets through an enclosed return leg 16 of the elevator. A discharge chute 18 communicates with the floor of the housing to transport grain dumped from conveyor 14 to the rotary distributor 20.

The distributor 20 comprises a conical body 22 of sheet or plate material which is sealed at the bottom to a circular plate floor 24 by means of an annular mounting bracket 26 (FIG. 2) or other suitable means. The distributor is suitably supported in an elevated position between the grain elevator housing 12 and the storage bins 60 such that the grain flows under gravitational force from the grain elevator into the distributor and thence to the storage bins.

The distributor includes a cylindrical extension 28 positioned in sealed engagement to the top of the distributor body to form a chamber 27. A generally Y-shaped fitting 30 has one input leg 32 coupled to the distributor end of the discharge chute 18 and a second input leg 34, enlarged at 35 (FIG. 2), which is sealably coupled to the outlet 84 of a rotary dump valve 80. The outlet 36 of fitting 30 is sealably coupled to the top end of a vertical chute section 38 extending into the distributor and having its bottom end loosely fitted within a rotary filling chute 40 to permit rotation of chute 40 around the fixed section 38. Section 38 is sealably mounted to the top 29 of extension 28 by a suitable seal and mounting collar 37 (FIG. 2).

An annular flange 39 is fixedly positioned on the inside of the cylindrical extension near the bottom thereof and extends inwardly to support the outer edge of a rotary sealing plate 50 shown in FIGS. 2 and 4. Plate 50 includes a central aperture 52 through which a flared top end 42 of the rotary filling chute 40 is extended during assembly of the distributor. A peripheral aperture 54 in plate 50 includes a downwardly depending collar 54' which fits within a top end segment 46 of a rotary air exhaust chute 45. Rotary chutes 40 and 45 are secured in spaced relationship to each other by means of a plurality of interconnecting brackets 49 and are rotated within body 22 as described below. Since rotary sealing plate 50 rests on flange 39 due only to its weight, it is free to rotate and the extension of collar 55 into end 46 of chute 45 causes the rotation of the sealing plate when chutes 40 and 45 are rotated. Thus, chamber 27 continuously communicates with chute 45 as the chutes 40 and 45 rotate but is sealed from the space within body 22 of the distributor and the atmosphere. It is noted that the seal need not be a perfectly airtight seal but it must be adequate to prevent excessive loss of air or dust. As will be explained below, air from chamber 27 and chute 45 communicating therewith it evacuated through an exhaust stack 66 which is sealably mounted to top 29 of chamber 27 by a sealing collar 67 (FIG. 2) or other suitable sealing means.

Chutes 40 and 45 have elongated center sections 43 and 47, respectively, which extend from the top end of the distributor at an angle to position bottom end segments 44 and 48, respectively, in alignment with one of a selected pair of apertures 25 and 25' formed in a circular pattern in the floor 24 of the distributor as seen in FIG. 3. A sliding seal 55 formed of an arcuate plate shown in FIG. 5 is sealably coupled around the open ends of chute segments 44 and 48 by sealing and mounting collars 56 as seen in FIG. 2. Seal 55 includes an inner aperture 57 having a diameter corresponding to the diameter of feeding chute 40 and an outer aperture 58 having a diameter corresponding to the diameter of exhaust chute 45. The bottom surface of seal 55 clears floor 24 to permit chutes 40 and 45 to rotate, but is sufficiently close and parallel to the surface of the floor to provide effective sealing between chutes 40 and 45 and apertures 25 and 25' respectively. As with seal 50, seal 55 need not provide a perfect airtight seal but only need be effective to prevent excessive leakage of air or dust.

Chutes 40 and 45 are rotated by a drive motor 41 (FIG. 2) coupled to a vertical rotary shaft 51 by means of a pair of sprockets 53, 53' (FIG. 3), an interconnecting chain 59, and a suitable drive gear and bearing assembly 41' extending through floor 24. Shaft 51 is fixedly coupled at the top end to one of the brackets 49 attached to the chutes and rotatably coupled to the floor 24 of the distributor by a bearing block assembly 51'. Motor 41 can be controlled by conventional control means to selectively actuate the motor to rotate chutes into alignment with successive apertures 25, 25' in the floor for sequentially filling the storage bins. A configurated cam 61 can be positioned on shaft 51 (FIG. 2) with a limit switch follower 61' mounted to floor 24 to deactivate the motor once alignment is achieved as indicated by a depression in cam 61 corresponding in angular position to the angular position of apertures 25, 25'. If automatic operation is desired, bin level indicators can be provided to control the rotation of chutes 40, 45 to fill additional bins as a bin becomes full.

Communicating between the grain distributor 20 and each of the storage bins 60 is a grain filling chute 62 and an evacuation chute 64. Each chute 62 has a flared top segment 63 secured in alignment with the aperture 25 in floor 24 by means of bolts or by other suitable fastening means. Likewise, each evacuation chute has a similar flared end 65 sealed to the underside of floor 24 in alignment with an aperture 25'. Chutes 62 and 64 extend outwardly and downwardly where the bottom ends are similarly sealably coupled to the storage bins 60.

Grain enters the distributor through chute 18 and exits the distributor at one of the selected grain chutes 62 in alignment with distributor chute 40 to fill one of the bins 60 as indicated by arrows A in FIGS. 1 and 2. Simultaneously, air and particulate material are drawn from the storage bin 60 through the evacuation chute 64, through the distributor exhaust chute 45, into the exhaust stack 66, and into precipitator 70 as indicated by arrow B in FIGS. 1 and 2. The top end of stack 66 is sealably coupled to the intake 72 of the cyclone precipitator 70 and an electric blower 75 (FIG. 1) draws the air and particulate material from the storage bin through the distributor system and the precipitator 70 and exhausts the filtered air through an exhaust outlet 78 as indicated by arrow C (FIG. 2). The precipitate material collected by the cyclone precipitator 70 is returned to the distributor 20 as indicated by the arrow D in FIG. 2 by means of a rotary dump valve 80. Valve 80 has a plurality of vanes 82 which effectively seals the negative pressure space in the precipitator and in chutes 66, 45 and 64 from the grain input chute 18 and fitting 30 to also provide a closed cycle system for returning particulate material to the filling stream.

It is seen, therefore, that the preferred embodiment increases the filling efficiency as well as providing return of particulate material gathered by the evacuation of air from a storage bin as it is filled. Various modifications to the preferred embodiment will become apparent to those skilled in the art. Such modifications may include, for example, seals for the distributor chutes having a design which differs from those shown. Also, the sealing valve can be different than the rotary valve described. These and other modifications, however, will fall within the scope of the present invention as defined by the appended claims.

The embodiments of the invention in which an exclusive property of privilege is claimed are defined as follows:

1. A rotary distributing system for distributing particulate material comprising:
   a plurality of material receiving bins, each bin including a filling chute and a separate evacuation chute extending therefrom;
   exhausting means;
   particulate material supplying means;
   a distributor positioned above said bins and including means for coupling each of said filling and evacuation chutes extending from said bins to said distributor, said distributor including a rotary filling chute coupled from said supplying means to a selected one of said filling chutes associated with a bin, and a rotary exhaust chute coupled from said exhausting means and the evacuation chute for the same bin; and
   means for moving said rotary chutes to fill desired ones of said bins while simultaneously evacuating displaced air therefrom.

2. The apparatus as defined in claim 1 wherein said distributor comprises a housing including a material inlet and an exhaust outlet at the top portion thereof and including a floor with a plurality of spaced pairs of apertures formed through said floor, each aperture pair communicating with a filling and an evacuation chute for a bin, said pairs of apertures formed around the periphery of said floor to provide communication with all of the bins of the system.

3. The apparatus as defined in claim 2 wherein said housing is generally conical and includes a cylindrical extension at the top thereof, said extension having a closed top plate through which said inlet extends; said distributor further including a circular sealing plate positioned in movable engagement with said housing near the bottom of said extension, said sealing plate having a central aperture through which one end of said rotary filling chute extends to communicate with said inlet and a peripheral aperture with a downwardly extending flange coupled to said rotary exhausting chute such that said extension and said sealing plate define a chamber which is in communication with said rotary exhaust chute, and means coupling said exhausting means in communication with said chamber.

4. The apparatus as defined in claim 3 wherein said distributor further includes a sliding sealing plate positioned around ends of said rotary chutes adjacent said floor of said distributor to effectively couple said chutes in sealed communication with selected ones of said pairs of apertures to which said filling and evacuation chutes are coupled as said rotary chutes are moved to fill selected bins.

5. The apparatus as defined in claim 1 wherein said means for moving said rotary chutes includes bracket means holding said rotary chutes in a fixed position relative to each other, and drive means coupled to said rotary chutes to rotate said chutes into position coupling said supplying means and said exhausting means to selected bin filling and evacuation chutes.

6. The apparatus as defined in claim 1 wherein said exhausting means includes an exhaust blower coupled to said rotary exhaust chute for drawing air from a bin through an evacuation chute associated therewith to maintain the bin and exhaust passages under negative pressure during the filling of a bin.

7. The apparatus as defined in claim 6 and further including a precipitator coupled between said blower and said rotary exhaust chute to precipitate particulate material from air evacuated from a bin, said precipitator including an outlet coupled to said supply means through a sealed valve.

8. A method of selectively filling a plurality of storage bins with grain or the like comprising:
   providing a supply of grain to be transferred to one or more storage bins;
   providing a rotary distributor with rotary grain filling and rotary air exhausting chutes selectively coupling said source of grain to bin filling and evacuation chutes of a desired one of the bins;
   evacuating air and lighter particulate material from said one bin through said rotary exhausting chute as it is being filled with grain from said rotary filling chute;
   separating lighter particulate material from the air evacuated from a bin once the material has passed the distributor;
   returning the separated particulate material to the grain filling stream upstream of said rotary filling chute; and
   rotating said rotary chutes to fill desired ones of said bins.

9. A rotary grain distribution system for distributing grain or the like to a plurality of storage bins comprising:
   a rotary distributor;
   supply means for supplying grain to said rotary distributor;
   air exhaust means; and
   said rotary distributor including a rotary filling chute continuously coupled to said supply means at one end thereof and rotatable to be selectively coupled at an opposite end to one of a plurality of filling chutes extending from said distributor and adapted to connect to any of a plurality of storage bins below the distributor, a plurality of evacuation chutes extending from said distributor and adapted to connect to any of the storage bins, said distributor further including a rotary exhaust chute continuously coupled at one end to said air exhaust means and selectively coupled at an opposite end to one of said evacuation chutes; said rotary filling chute and said rotary exhaust chute positioned to be coupled to the same storage bin during the filling thereof.

10. The apparatus as defined in claim 9 wherein said distributor includes a floor supported above said bins and including a plurality of pairs of apertures formed in a circular pattern therein, each pair including an aperture communicating with a bin filling chute and an aperture communicating with a bin evacuation chute, and wherein said rotary chutes are rotatably mounted to said floor to be moved in alignment with a desired aperture pair for filling a bin coupled thereto.

11. The apparatus as defined in claim 9 wherein said rotary chutes are fixedly coupled to each other and include a sliding sealing plate coupled at said opposite ends of said rotary chutes parallel to said floor to effectively seal said rotary chutes to said aperture pairs when in alignment therewith.

12. The apparatus as defined in claim 11 wherein said air exhaust means includes a blower for drawing air from a storage bin and means coupling said blower to said rotary exhaust chute.

13. The apparatus as defined in claim 12 wherein said rotary filling and exhaust chutes are coupled to a rotatable shaft extending vertically from said floor with said one end of said filling chute aligned with the axis of rotation of said shaft, said supply means including a rotating sealing joint between a fixed input chute loosely coupled to said one end of said rotary filling chute permitting relative rotation therebetween; and wherein said means coupling said blower to said rotary exhaust chute includes a chamber communicating with said exhaust blower and a rotating seal forming the floor of the chamber and having an aperture continuously coupling said rotary exhaust chute to said chamber as said rotary chutes are rotated to fill the storage bins.

14. The apparatus as defined in claim 9 wherein said air exhaust means comprises:
a precipitator having an intake coupled to said rotary exhaust chute of said distributor, said precipitator further including an air outlet and an outlet for particulate material collected by said precipitator;
an exhaust blower coupled to said air outlet of said precipitator for drawing air and particulate material from a bin through said precipitator; and
a sealed valve having an intake end coupled to said outlet for particulate material, and an outlet coupled to said rotary filling chute whereby the distributor system is maintained under negative pressure during the filling of bins and particulate material is collected and returned to the filling stream.

15. The apparatus as defined in claim 14 wherein said distributor includes a floor supported above said bins and including a plurality of pairs of apertures formed in a circular pattern therein, each pair including an aperture communicating with a bin filling chute and an aperture communicating with a bin evacuation chute, and wherein said rotary chutes are rotatably mounted to said floor to be moved in alignment with a desired aperture pair for filling a bin coupled thereto.

16. The apparatus as defined in claim 15 wherein said rotary chutes are fixedly coupled to each other and include a sliding sealing plate coupled at said opposite ends of said rotary chutes parallel to said floor to effectively seal said rotary chutes to said aperture pairs when in alignment therewith.

17. The apparatus as defined in claim 16 wherein said rotary filling and exhaust chutes are coupled to a rotatable shaft extending vertically from said floor with said one end of said filling chute aligned with the axis of rotation of said shaft, said supply means including a rotating sealing joint between a fixed input chute loosely coupled to said one end of said rotary filling chute permitting relative rotation therebetween; and wherein said means coupling said blower to said rotary exhaust chute includes a chamber communicating with said exhaust blower and a rotating seal forming the floor of the chamber and having an aperture continuously coupling said rotary exhaust chute to said chamber as said rotary chutes are rotated to fill the storage bins.

* * * * *